(12) United States Patent
Kao et al.

(10) Patent No.: US 8,572,668 B2
(45) Date of Patent: Oct. 29, 2013

(54) DIGITAL BROADCASTING SIGNAL DISPLAYING SYSTEM AND SIGNAL PROCESSING METHOD THEREOF

(75) Inventors: Chin-Cheng Kao, Hsinchu (TW); Ching-Yao Yang, Hsinchu (TW); Chih-Ming Lin, Hsinchu (TW)

(73) Assignee: Skymedi Corporation, Hsinchu (TW)

( * ) Notice: Subject to any disclaimer, the term of this patent is extended or adjusted under 35 U.S.C. 154(b) by 113 days.

(21) Appl. No.: 13/164,570

(22) Filed: Jun. 20, 2011

(65) Prior Publication Data

US 2012/0266206 A1    Oct. 18, 2012

(30) Foreign Application Priority Data

Apr. 18, 2011    (TW) .............................. 100113371 A

(51) Int. Cl.
| | |
|---|---|
| *H04N 7/173* | (2011.01) |
| *H04N 7/16* | (2011.01) |
| *H04N 5/00* | (2011.01) |
| *H04N 5/44* | (2011.01) |
| *H03M 1/12* | (2006.01) |

(52) U.S. Cl.
USPC ........... 725/133; 725/141; 725/153; 348/572; 348/607; 348/725; 348/731; 348/732

(58) Field of Classification Search
None
See application file for complete search history.

(56) References Cited

U.S. PATENT DOCUMENTS

| | | | |
|---|---|---|---|
| 2003/0140343 A1* | 7/2003 | Falvo et al. ...................... 725/51 |
| 2003/0154492 A1* | 8/2003 | Falvo et al. ................... 725/113 |
| 2004/0068744 A1* | 4/2004 | Claussen et al. ................ 725/81 |
| 2007/0064820 A1* | 3/2007 | Chang ........................... 375/259 |
| 2007/0200727 A1* | 8/2007 | Sakamoto ................ 340/825.25 |
| 2009/0193452 A1* | 7/2009 | Russ et al. ....................... 725/31 |
| 2010/0313232 A1* | 12/2010 | Norin ............................. 725/110 |
| 2012/0079525 A1* | 3/2012 | Ellis et al. ........................ 725/28 |
| 2012/0216230 A1* | 8/2012 | Vare et al. ........................ 725/62 |

FOREIGN PATENT DOCUMENTS

| | | | |
|---|---|---|---|
| TW | I252694 B | 4/2006 |
| TW | I283114 B | 6/2007 |

* cited by examiner

*Primary Examiner* — Nasser Goodarzi
*Assistant Examiner* — Fred Peng
(74) *Attorney, Agent, or Firm* — Stout, Uxa, Buyan & Mullins, LLP

(57) ABSTRACT

A digital broadcasting signal processing method for processing a multimedia stream by a set-top box is disclosed. A USB request command set is pre-defined in a digital signal receiving unit to support the set-top box. The digital signal receiving unit transmits data with the set-top box and controls the signal quality of the data transmission according to the USB request commands transmitted by the set-top box while the digital signal receiving unit connected with the set-top box via USB.

22 Claims, 5 Drawing Sheets

DIGITAL BROADCASTING SIGNAL DISPLAYING SYSTEM AND SIGNAL PROCESSING METHOD THEREOF

CROSS-REFERENCE TO RELATED APPLICATIONS

The entire contents of Taiwan Patent. Application No. 100113371, filed on Apr. 18, 2011, from which this application claims priority, are incorporated herein by reference.

BACKGROUND OF THE INVENTION

1. Field of the Invention

The present invention generally relates to display systems, and more particularly to a digital broadcasting signal displaying system and signal processing method, and a digital signal receiving unit used for the digital broadcasting signal displaying system.

2. Description of Related Art

Besides the well known functionality of facilitating the watching of traditional TV shows, set-top boxes are increasingly being utilized, by users for receiving digital video programs to improve entertainment value and quality of life as well. Referring to the drawings, FIG. 1 shows a schematic diagram of a conventional digital broadcasting signal displaying system. The conventional digital broadcasting signal displaying system comprises a set-top box 13 in which an antenna module 15 is built. The antenna module 15 is configured to receive a digital broadcasting signal such as that containing various channel video programs from a far broadcasting server 17. After receiving the digital broadcasting signal, the set-top box 13 operates to demodulate, de-multiplex or decode the received signal, for transmission thereof to a display device 11 for display.

However, complications can arise resulting from various standards of the digital broadcasting signal which may exist according to corresponding regions or areas. The conventional set-top box 13 usually can demodulate the particular standard of digital broadcasting signal for the corresponding area only. When using the conventional set-top box 13 to display digital broadcasting channels in different areas, the digital broadcasting signal typically cannot be demodulated due to the different standards of the digital broadcasting signal over the different areas. Because of the limitation of compatibility, the digital broadcasting channel cannot be displayed in different areas. Furthermore, as the processed video data by the set-top box 13 is outputted directly to the display device 11 for display rather than being stored, repeated displaying (e.g., from storage and subsequent retrieval of the data) cannot be achieved.

Owing to these and other concerns, a need has arisen to propose a novel digital broadcasting signal displaying system and method which is free from the limitation of demodulating standards and able to store the received video stream for future use (e.g., displaying).

SUMMARY OF THE INVENTION

In view of the foregoing, it is an object of the embodiment of the present invention to provide a digital broadcasting signal displaying system and method thereof to receive and transmit a video stream by the signal receiving device comprising a USB interface to avoid the limitation of demodulating standards. The received video stream also can be stored for utilization in the future.

According to one embodiment, a digital broadcasting signal displaying system tied in with a display device is disclosed. The digital broadcasting signal displaying system comprises a digital signal receiving unit and a set-top box. The digital signal receiving unit comprises an antenna module and a demodulator. The antenna module is configured to receive a transport stream. The set-top box comprises a USB control unit which transmits USB request commands to the digital signal receiving unit and receives USB data packets transmitted from the digital signal receiving unit. Wherein, the USB control unit transmits USB request commands to transmit the transport stream from the digital signal receiving unit to the set-top box. The set-top box demultiplexes and demodulates the transport stream, and the processed signals by the set-top box may be outputted to the display device for being displayed, and/or being stored in a storage unit configured in the digital signal receiving unit via USB.

According to another embodiment, a digital broadcasting signal processing method for displaying a multimedia stream by a set-top box is disclosed. The method comprises the following steps: firstly, the set-top box transmits the USB request commands to the digital signal receiving unit. Then, the digital signal receiving unit receives a digital broadcasting signal and demodulates it to generate a transport stream. Finally, the digital signal receiving unit transmits the transport stream to the set-top box, and the set-top box demultiplexes and demodulates the transport stream.

According to another embodiment, a digital signal receiving unit for a digital broadcasting signal displaying system is disclosed. The digital signal receiving unit is coupled to a set-top box via a USB interface. The digital signal receiving unit comprises an antenna module, a receiver, a demodulator and a USB transport device. The receiver is configured to receive a digital broadcasting signal via the antenna module. The demodulator receives the digital broadcasting signal transmitted from the receiver and demodulates it to generate a transport stream. USB request command set is pre-defined in the USB transport device to support the set-top box, and the USB transport device outputs the transport stream to the set-top box after receiving the USB request commands from the set-top box. The set-top box then demultiplexes and demodulates the transport stream to display the digital broadcasting signal.

In one embodiment, the processed signals by the set-top box may be outputted to the display device for display, and/or be stored in the digital signal receiving unit via USB to enable repeated displaying.

In another embodiment, the digital signal receiving unit transmits the signal-to-noise ratio (SNR) of the digital broadcasting demodulating signal to the set-top box after receiving the USB request command from the set-top box. Then, the set-top box transmits the USB request command to adjust the signal quality of the data transmission according to the received signal-to-noise ratio, so as to detect and control the digital signal receiving unit to maintain the signal quality.

DETAILED DESCRIPTION OF THE INVENTION

Figure 1:
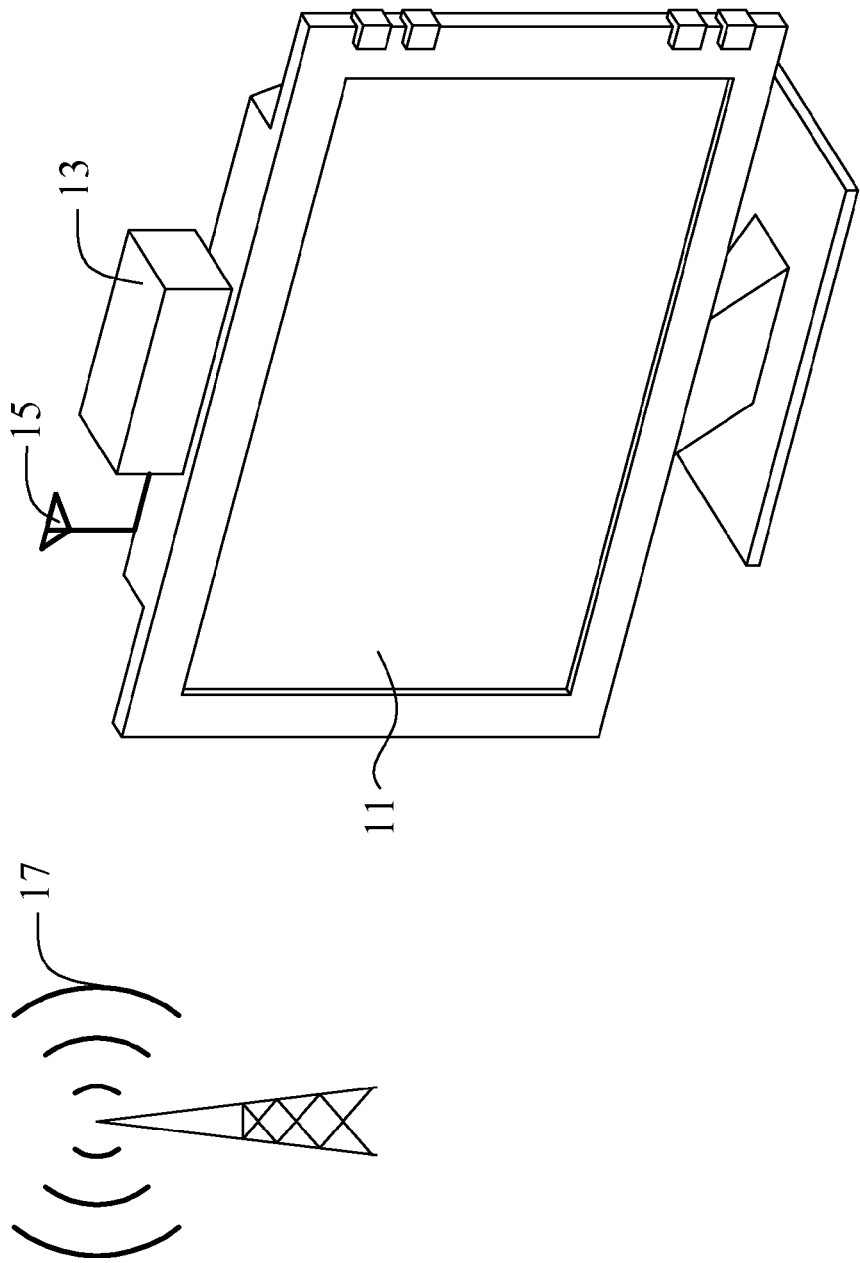
FIG. 1 shows a schematic diagram of a conventional digital broadcasting signal displaying system.
Figure 2:
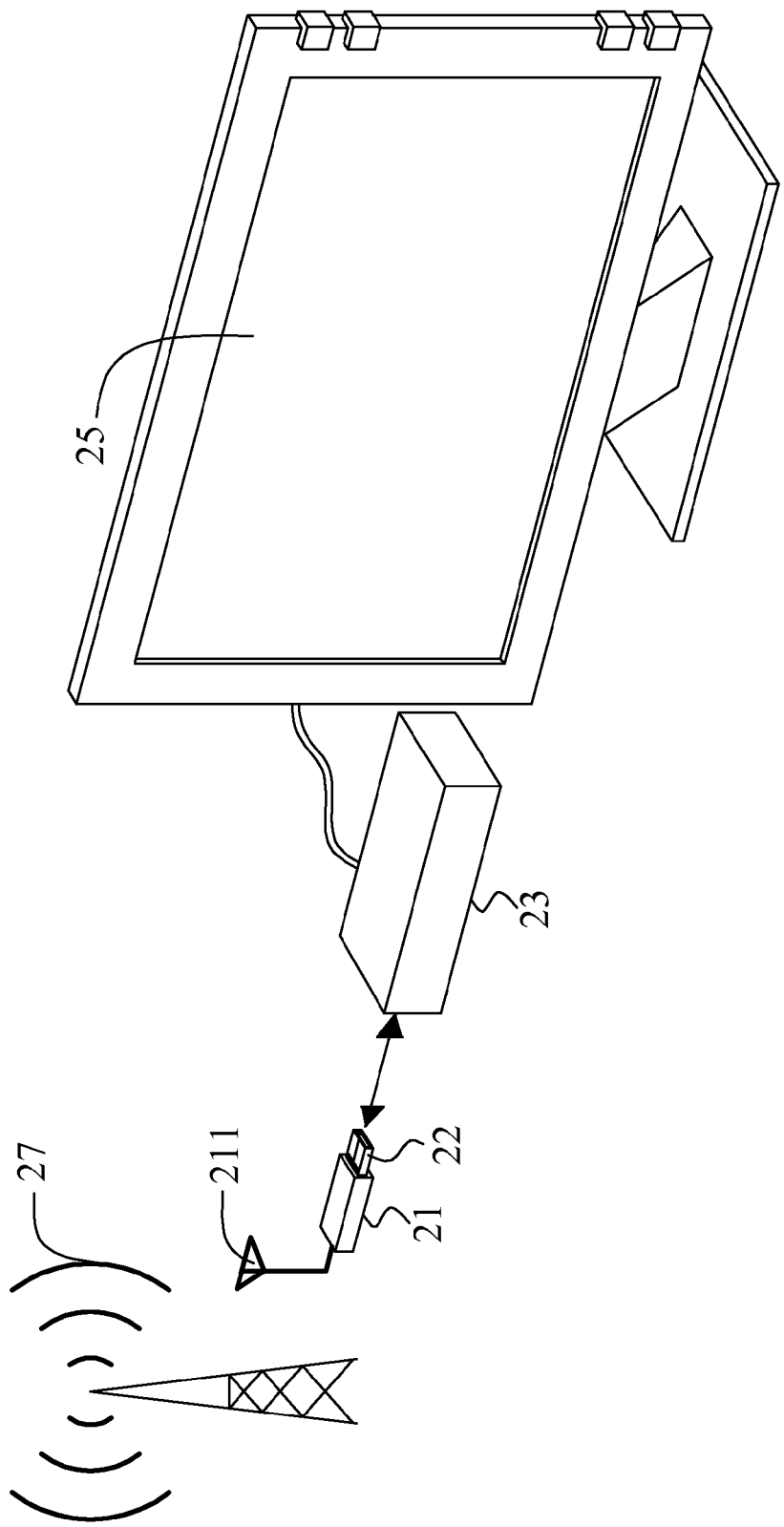
FIG. 2 shows a schematic diagram of a digital broadcasting signal displaying system according to one embodiment of the present invention.

Turning to FIG. 2, a schematic diagram of a digital broadcasting signal displaying system according to one embodiment of the present invention is portrayed, comprising a digital signal receiving unit 21 and a set-top box 23. The digital signal receiving unit 21 comprises an antenna module 211 which is configured to receive a digital broadcasting signal such as signals of various channel video programs transmitted from a broadcasting server 27. The digital signal receiving unit 21 is coupled to the set-top box 23 via a USB interface 22, and the digital signal receiving unit 21 transmits the demodulated digital broadcasting signal to the set-top box 23 to process. Therefore, processed signals by the set-top box 23 not only can be displayed in a display device 25 but also can be stored in the digital signal receiving unit 21.

Specifically, the digital signal receiving unit 21 is a USB device, and the antenna module 211 may be embedded in the shell of the digital signal receiving unit 21 to receive the digital broadcasting signal. The digital broadcasting signal may conform to the standards of Digital Video Broadcasting-Terrestrial (DVB-T), Digital Video Broadcasting-Handheld (DVB-H), Digital Audio Broadcasting (DAB), Advanced Television Systems Committee (ATSC), and Integrated Services Digital Broadcasting (ISDB). The display device 25 comprises a plasma display panel (PDP or Plasma TV), a liquid, crystal display (LCD) TV, a CRT TV, or a digital TV (DTV).

Figure 3:
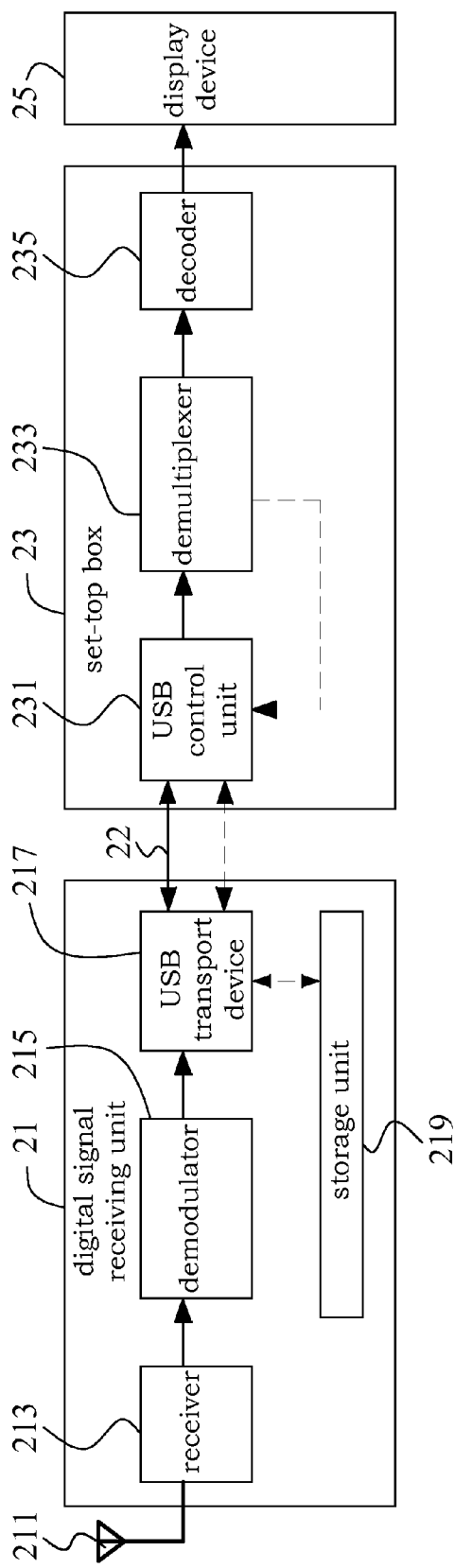
FIG. 3 shows a block diagram illustrating the digital broadcasting signal displaying system according, to one embodiment of the present invention.

FIG. 3 is a block diagram illustrating the digital broadcasting signal displaying system according to one embodiment of the present invention. The digital signal receiving unit 21 further comprises a receiver 213, a demodulator 215, a USB transport device 217 and a storage unit 219. The receiver 213, coupled to the antenna module 211, is configured to receive the digital broadcasting signal. The demodulator 215, coupled to the receiver 213, is configured to demodulate the received digital broadcasting signal from the antenna module 211 to generate the transport stream of TV channels. Specifically, the receiver 213 and the demodulator 215 can be integrated into a tuner which is used for demodulating the digital broadcasting signal of at least one standard.

The digital signal receiving unit 21 receives the USB request commands and transmits/receives data via the USB transport device 217. A USB request command set, which is pre-defined by vender in a digital signal receiving unit 21, comprises a plurality of the USB request commands which provides various functions such as reading parameters, writing parameters, or transmitting data, etc. When initializing the digital signal receiving unit 21 and the set-top box 23, it needs to confirm whether the corresponding USB request commands are supported via the USB control endpoint. Accordingly, the set-top box 23 can read the signal-to-noise ratio (SNR), adjust the analog-to-digital conversion (ADC) gain of the digital signal receiving unit 21, and transmit data to the digital signal receiving unit 21.

The set-top box 23 includes a USB control unit 231, a demultiplexer 233 and a decoder 235. The USB control unit 231 transmits USB data packets in a USB Bulk In mode to request the digital signal receiving unit 21 to send back the transport stream of selected TV channels. After receiving the request, the digital signal receiving unit 21 transmits the transport stream of requested TV channels. Wherein, the transport stream of requested. TV channels are encapsulated in the USB packets which are transmitted to the USB control unit 231 of the set-top box 23 via the USB interface 22.

Besides, the USB control unit 231 transmits the USB request commands to the digital signal receiving unit 21 to request it to transmit the real time signal-to-noise ratio of the digital broadcasting demodulated signals as well, so as to adjust the signal quality by transmitting the USB request command to digital signal receiving unit 21 according to the received, signal-to-noise ratio. That is, when detecting inferior quality of digital broadcasting demodulated signals, the set-top box 23 uses the USB request commands which the vender defined to amend the corresponding parameters of the digital signal receiving unit 21 in USB control mode, so as to monitor and control the digital signal receiving unit 21.

In one embodiment, the set-top box 23 uses firmware (not shown) to initialize a software timer (not shown), and the USB control unit 231 issues the corresponding USB request commands periodically to read the signal-to-noise ratio of the transported video stream by the digital signal receiving unit 21. Once the received signal-to-noise ratio is smaller than a pre-defined threshold, the USB control unit 231 further transmits the corresponding USB request commands to amend the analog-to-digital conversion gain of the digital signal receiving unit 21.

The demultiplexer 233 is coupled to the USB control unit 231. When receiving the transport stream from the USB control unit 231, the demultiplexer 233 demultiplexes it into a multimedia coding data. Specifically, the multimedia coding data comprises the multimedia format data of a selected. TV program. The decoder 235, coupled to the demultiplexer 233, is configured to decode the multimedia coding data into a multimedia stream according to the coding format. Then, the set-top box 23 can transmit the decoded multimedia stream to the display device 25 for display.

In one embodiment, the demultiplexed multimedia coding data not only can be displayed directly by decoding but also can be outputted to the digital signal receiving unit 21 by the USB control unit 231. The digital signal receiving unit 21 then receives the multimedia coding data via the USB transport device 217 and stores it in the storage unit 219 for facilitating repeated displaying in the future. Wherein, the multimedia coding data in the storage unit 219 can be decoded by the decoder 235 for display, the digital signal receiving unit 21 also can be considered as a storage device storing the multimedia coding data, and displays the multimedia coding data in other displays having decoders.

Sequentially, the embodiments of the USB transport device 217 and the USB control unit 231 will be explained. The USB transport device 217 of the digital signal receiving unit 21 comprises a USB control endpoint, two USB bulk in endpoint, and a USB bulk out endpoint. The demodulated transport stream is transmitted to the USB control unit 231 of the set-top box 23 via the USB interface 22 and one of the USB bulk in endpoint of the USB transport device 217. The USB control unit 231 transmits the USB request commands which the vender defined via the USB control endpoint of the USB transport device 217 to monitor and control the digital signal receiving unit 21. The set-top box 23 stores the multimedia video stream in the storage unit 219 of the digital signal receiving unit 21 via the USB bulk out endpoint of the USB transport device 217, and the digital signal receiving unit 21 transmits the multimedia video stream stored in the storage unit 219 to the set-top box 23 for display via the other USB bulk in endpoint of the USB transport device 217.

Figure 4:
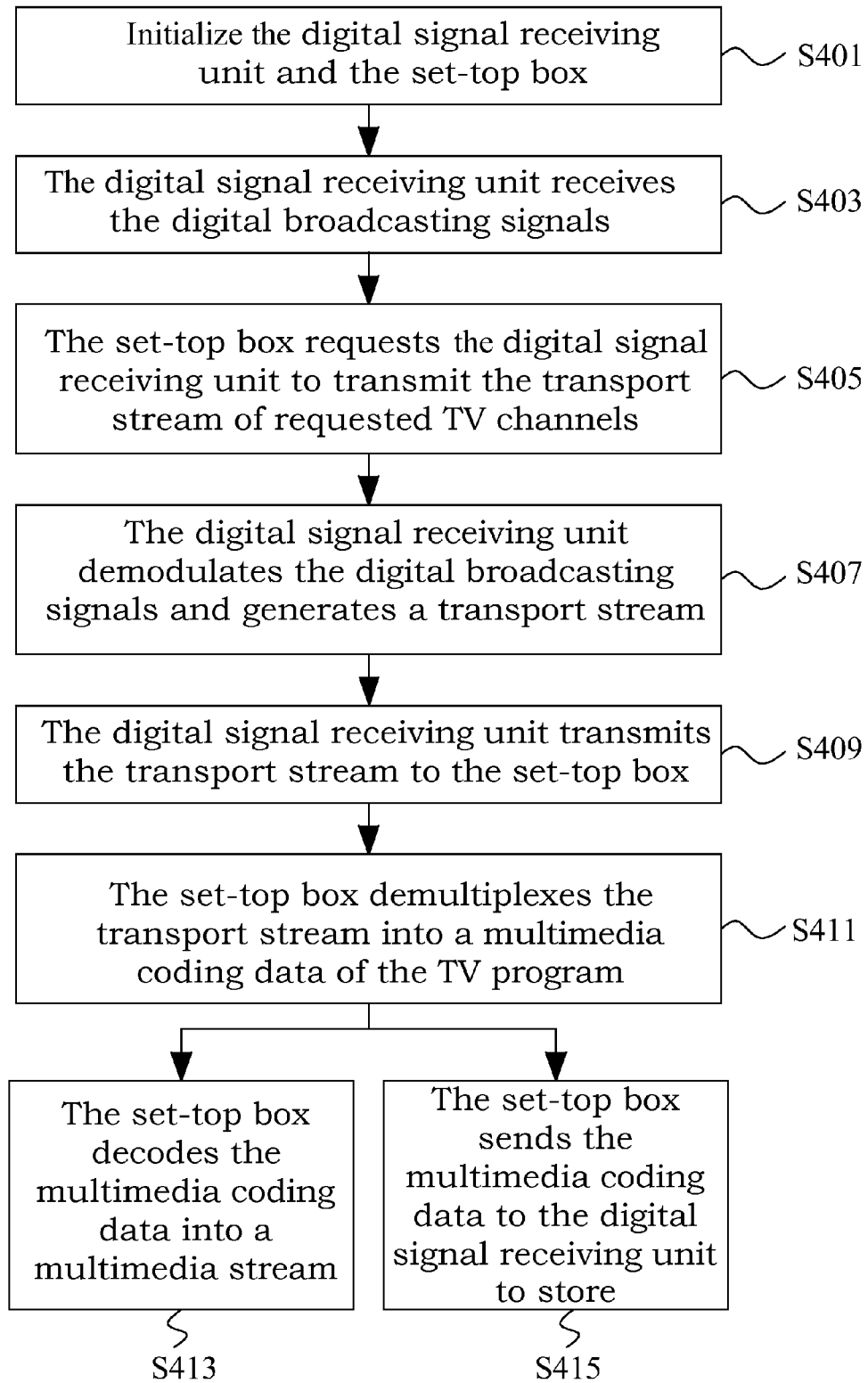
FIG. 4 shows a flow diagram illustrating a digital broadcasting signal displaying method according to one embodiment of the present invention.

FIG. 4 is a flow diagram illustrating a digital broadcasting signal displaying method according to one embodiment of the present invention. The method comprises the following steps.

The digital signal receiving unit 21 connects the set-top box 23 to perform initialization, so as to recognize the USB request commands which can be supported between the set-top box 23 and the digital signal receiving unit 21 in step S401. The antenna module 211 starts to receive the digital broadcasting signals transmitted from the broadcasting server 27 in step S403. Then, in step S405, the set-top box 23 issues the USB request commands to the digital signal receiving unit 21 to request it to transmit the transport stream of requested TV channels. After receiving the request, the demodulator 215 demodulates the digital broadcasting signals and generates a transport stream in step S407.

In step S409, the transport stream generated by the demodulator 215 is transmitted from the digital signal receiving unit 21 to the USB control unit 231 of the set-top box 23 via the USB transport device 217. Then, the USB control unit 231 transmits the transport stream to the demultiplexer 233, and the demultiplexer 233 demultiplexes it into a multimedia coding data of the TV program in step S411. The demultiplexed multimedia coding data is transmitted to the decoder 235 to decode into a multimedia stream in step S413. It is worth mentioning that the USB control unit 231 can issue the corresponding USB request command to transmit the demultiplexed multimedia coding data to the digital signal receiving unit 21 after the step S411. The digital signal receiving unit 21 receives and stores the multimedia coding data in the storage unit 219 via the USB transport device 217 for repeatedly displaying in the future in step S415.

Figure 5:
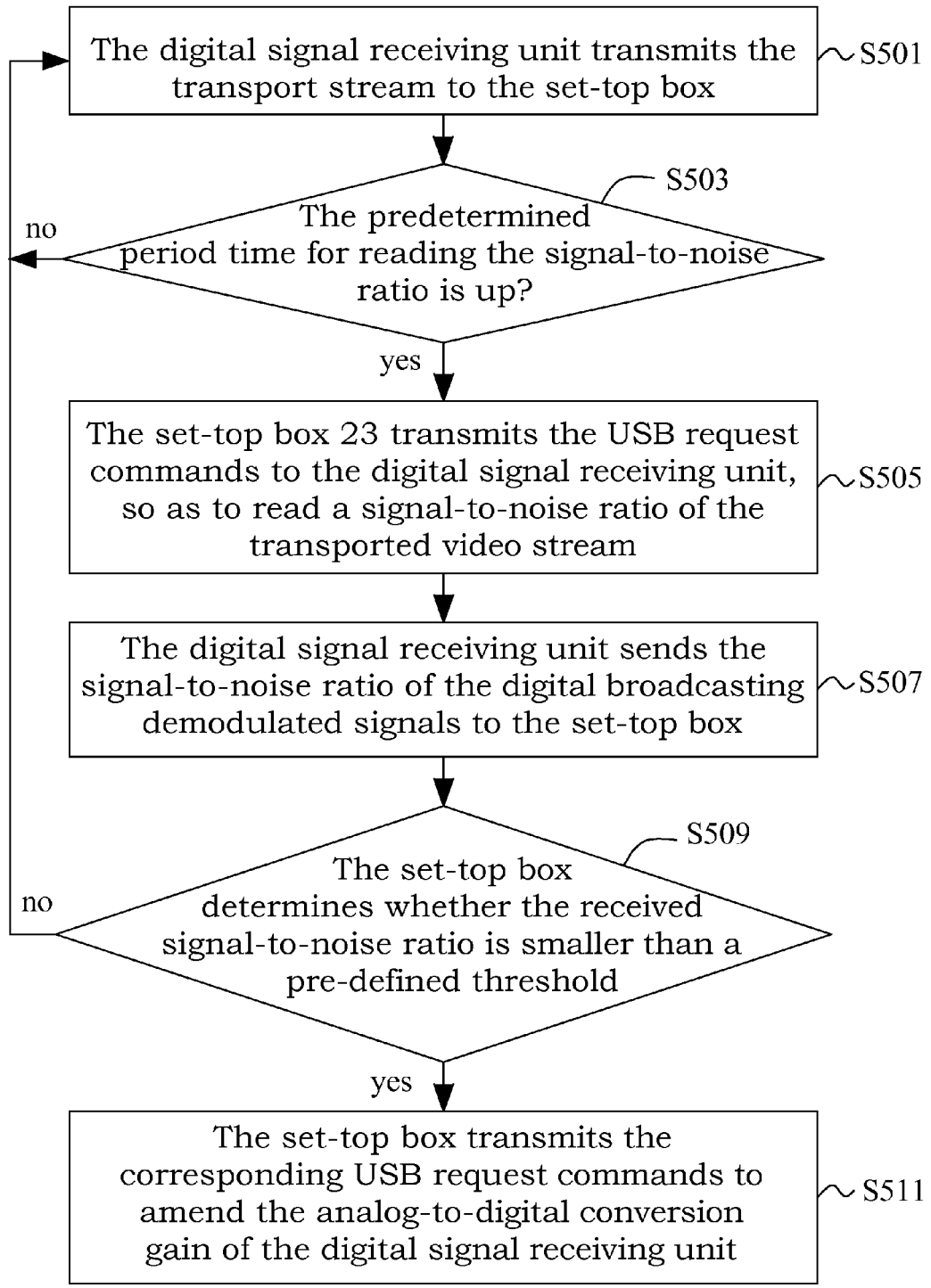
FIG. 5 shows a flow diagram illustrating the digital broadcasting signal displaying method for controlling signal quality according to one embodiment of the present invention.

Finally, with reference to FIG. 5, a flow diagram illustrates the digital broadcasting signal displaying method for controlling signal quality according to one embodiment of the present invention. The USB control unit 231 of the set-top box 23 transmits the corresponding USB request commands to the digital signal receiving unit 21 periodically during transmitting the multimedia stream, so as to read a signal-to-noise ratio of the transported video stream in steps S501-S505. Then, the digital signal receiving unit 21 sends the signal-to-noise ratio of the digital broadcasting demodulated signals to the set-top box 23 after receiving the USB request command in step S507. The set-top box 23 determines whether the received signal-to-noise ratio is smaller than a pre-defined threshold in step S509. If not, it continues to receive the transport stream. If the received signal-to-noise ratio is smaller than the pre-defined threshold, the USB control unit 231 further transmits the corresponding USB request commands to amend the analog-to-digital conversion gain of the digital signal receiving unit in step S511. The digital signal receiving unit 21 uses the amended gain to process the transport stream to improve signal quality of the data transmission.

In one embodiment, the firmware of the set-top box 23 to initialize a software timer to provide an interrupt service routine. The timer interrupts every pre-determined period to execute the interrupt service routine. The interrupt service routine issues the vender defined USB request commands to read the real time signal-to-noise ratio of the digital broadcasting demodulated signals stored in the digital signal receiving unit 21. After the set-top box 23 receives the signal-to-noise ratio packet, the interrupt service routine decapsulates the packet to get the signal-to-noise ratio and determines whether the signal-to-noise ratio is smaller than a pre-defined threshold. If yes, the USB control unit 231 further transmits the corresponding USB request commands to amend the analog-to-digital conversion gain of the digital signal receiving unit 21, so as to maintain signal quality of the data transmission.

As mentioned above, the conventional set-top box usually can demodulate the particular standard of digital broadcasting signal only. According to the present invention, the set-top box 23 can connect the digital signal receiving units 21 with various demodulating standards, so as to be free from the limitation of demodulating standards.

Furthermore, the present invention uses commands which are the vender defined to monitor and control the signal-to-noise ratio of the digital signal receiving unit to adjust and maintain signal quality of the data transmission.

Moreover, the multimedia coding data in the set-top box can be transmitted to the digital signal receiving unit via the USB interface, and the received video stream also can be stored in the storage device for utilization in the future.

Although specific embodiments have been illustrated and described, it will be appreciated by those skilled in the art that various modifications may be made without departing from the scope of the present invention, which is intended to be limited solely by the appended claims.

What is claimed is:

1. A digital broadcasting signal displaying system, comprising:
    a digital signal receiving unit, comprising:
        an antenna module configured to receive a digital broadcasting signal;
        a demodulator configured to demodulate the digital broadcasting signal to generate a transport stream; and
        a USB transport device configured to receive USB request commands to output the transport stream; and
    a set-top box coupled to the digital signal receiving unit via USB interface to process and display the transport stream, and the set-top box comprises:
        a USB control unit configured to transmit USB request commands to the USB transport device and request the digital signal receiving unit to transmit the transport stream to the set-top box, wherein the USB control unit is configured to issue USB request commands to amend the analog-to-digital conversion gain of the digital signal receiving unit according to a signal-to-noise ratio of the digital signal receiving unit.

2. The system of claim 1, wherein the digital signal receiving unit further comprises a receiver, and the demodulator is configured to receive the digital broadcasting signal received by the antenna module via the receiver.

3. The system of claim 2, wherein the set-top box further comprises:
    a demultiplexer coupled to the USB control unit and configured to demultiplex the transport stream into a multimedia coding data of a TV program.

4. The system of claim 3, wherein the set-top box further comprises:
    a decoder coupled to the demultiplexer and configured to decode the multimedia coding data into a multimedia stream for display in connection with the TV program.

5. The system of claim 3, wherein the digital signal receiving unit further comprises a storage unit, and the USB control unit is configured to issue USB request commands to transmit the multimedia coding data in the storage unit.

6. The system of claim 4, wherein the USB control unit is configured to issue USB request commands periodically to read the signal-to-noise ratio (SNR) of the digital signal receiving unit.

7. The system of claim 1, wherein the digital broadcasting signal conforms to the standards of Digital Video Broadcasting-Terrestrial (DVB-T), Digital Video Broadcasting-Handheld (DVB-H), Digital Audio Broadcasting (DAB), Advanced Television Systems Committee (ATSC), and Integrated Services Digital Broadcasting (ISDB).

8. A digital broadcasting signal processing method for displaying a multimedia stream by a set-top box, the method comprising:
connecting a digital signal receiving unit to the set-top box via a USB transport device;
initializing the set-top box and the digital signal receiving unit via the USB transport device;
receiving a digital broadcasting signal by the digital signal receiving unit; and
the set-top box issuing USB request commands to the digital signal receiving unit, so as to request transmission of data stored in the digital signal receiving unit to the set-top box, wherein the set-top box transmits USB request commands to amend the analog-to-digital conversion gain of the digital signal receiving unit according to a signal-to-noise ratio transmitted from the digital signal receiving unit.

9. The method of claim 8, wherein the set-top box issues USB request commands to transmit a transport stream by the digital signal receiving unit, and the method further comprises:
the digital signal receiving unit demodulating the received digital broadcasting signal into the transport stream according to the USB request commands issued by the set-top box; and
the digital signal receiving unit transmitting the demodulated transport stream to the set-top box via the USB transport device.

10. The method of claim 9, wherein the set-top box issues the USB request commands to request the digital signal receiving unit to transmit the signal-to-noise ratio, and the method further comprises:
the digital signal receiving unit transmitting the signal-to-noise ratio to the set-top box via the USB transport device.

11. The method of claim 10, wherein the set-top box issues USB request commands periodically to request the digital signal receiving unit to transmit the signal-to-noise ratio.

12. The method of claim 11, wherein the set-top box uses firmware to initialize a software timer to provide an interrupt service routine, and the interrupt service routine issues the USB request commands periodically to request the digital signal receiving unit to transmit the signal-to-noise ratio, so as to amend the analog-to-digital conversion gain of the digital signal receiving unit according to the signal-to-noise ratio by issuing the USB request commands.

13. The method of claim 9, further comprising:
the set-top box demultiplexing the transport stream into multimedia coding data of a TV program after receiving the transport stream.

14. The method of claim 13, further comprising:
the set-top box decoding the multimedia coding data into a multimedia stream for display according to the TV program.

15. The method of claim 14, further comprising:
the set-top box transmitting USB request commands to decode the multimedia coding data; and
the multimedia coding data being sent to the digital signal receiving unit according to stored data.

16. The method of claim 8, wherein the digital broadcasting signal conforms to the standards of Digital Video Broadcasting-Terrestrial (DVB-T), Digital Video Broadcasting-Handheld (DVB-H), Digital Audio Broadcasting (DAB), Advanced Television Systems Committee (ATSC), and Integrated Services Digital Broadcasting (ISDB).

17. A digital signal receiving unit for a digital broadcasting signal displaying system, the digital signal receiving unit being coupled to a set-top box via a USB interface, and comprising:
an antenna module configured to receive a digital broadcasting signal;
a receiver configured to receive the digital broadcasting signal by the antenna module;
a demodulator coupled to the receiver and configured to demodulate the digital broadcasting signal to generate a transport stream; and
a USB transport device having USB request commands for supporting the set-top box, the USB transport device being configured to transmit the transport stream to the set-top box and to amend the analog-to-digital conversion gain of the digital signal receiving unit according to a signal-to-noise ratio of the digital signal receiving unit after receiving USB request commands.

18. The unit of claim 17, wherein the USB transport device is configured to transmit the signal-to-noise ratio to the set-top box after receiving the USB request commands.

19. The unit of claim 17, wherein the USB transport device is configured to receive multimedia coding data transmitted by the set-top box after receiving the USB request commands.

20. The unit of claim 19, further comprising a storage unit which is used to store the multimedia coding data.

21. The unit of claim 20, wherein the USB transport device is configured to transmit the multimedia coding data stored in the storage unit to the set-top box.

22. The unit of claim 17, wherein the digital broadcasting signal conforms to the standards of Digital Video Broadcasting-Terrestrial (DVB-T), Digital Video Broadcasting-Handheld (DVB-H), Digital Audio Broadcasting (DAB), Advanced Television Systems Committee (ATSC), and Integrated Services Digital Broadcasting (ISDB).

* * * * *